(12) United States Patent
Klostermann

(10) Patent No.: US 9,118,265 B2
(45) Date of Patent: Aug. 25, 2015

(54) PULSED PLASMA ENGINE AND METHOD

(71) Applicant: Heinrich Franz Klostermann, Palo Alto, CA (US)

(72) Inventor: Heinrich Franz Klostermann, Palo Alto, CA (US)

( * ) Notice: Subject to any disclaimer, the term of this patent is extended or adjusted under 35 U.S.C. 154(b) by 0 days.

(21) Appl. No.: 14/508,410

(22) Filed: Oct. 7, 2014

(65) Prior Publication Data
US 2015/0020519 A1    Jan. 22, 2015

Related U.S. Application Data

(62) Division of application No. 13/727,348, filed on Dec. 26, 2012, now Pat. No. 8,850,809.

(51) Int. Cl.
*H02N 11/00* (2006.01)
*H02N 10/00* (2006.01)
*F01B 29/00* (2006.01)

(52) U.S. Cl.
CPC .............. *H02N 11/006* (2013.01); *F01B 29/00* (2013.01); *H02N 10/00* (2013.01); *H02N 11/008* (2013.01); *Y10S 74/09* (2013.01)

(58) Field of Classification Search
None
See application file for complete search history.

(56) References Cited

U.S. PATENT DOCUMENTS

| 3,670,494 A | 6/1972 | Papp |
| 4,428,193 A * | 1/1984 | Papp ............................ 60/509 |
| 7,076,950 B2 | 7/2006 | Klostermann |

FOREIGN PATENT DOCUMENTS

WO    2014031190 A2    2/2014

* cited by examiner

*Primary Examiner* — Christopher Jetton
(74) *Attorney, Agent, or Firm* — Edward S. Wright

(57) ABSTRACT

Pulsed plasma engine and method in which a noncombustible gas is introduced into an explosion chamber, the gas is ionized to form a plasma within the chamber, an electrical pulse is applied to the plasma to heat the plasma, the pulse is turned off to produce an explosive pressure pulse in the plasma, and the plasma is confined in the chamber by a magnetic field that directs the pressure pulse toward an output member which is driven by the pressure pulse.

16 Claims, 4 Drawing Sheets

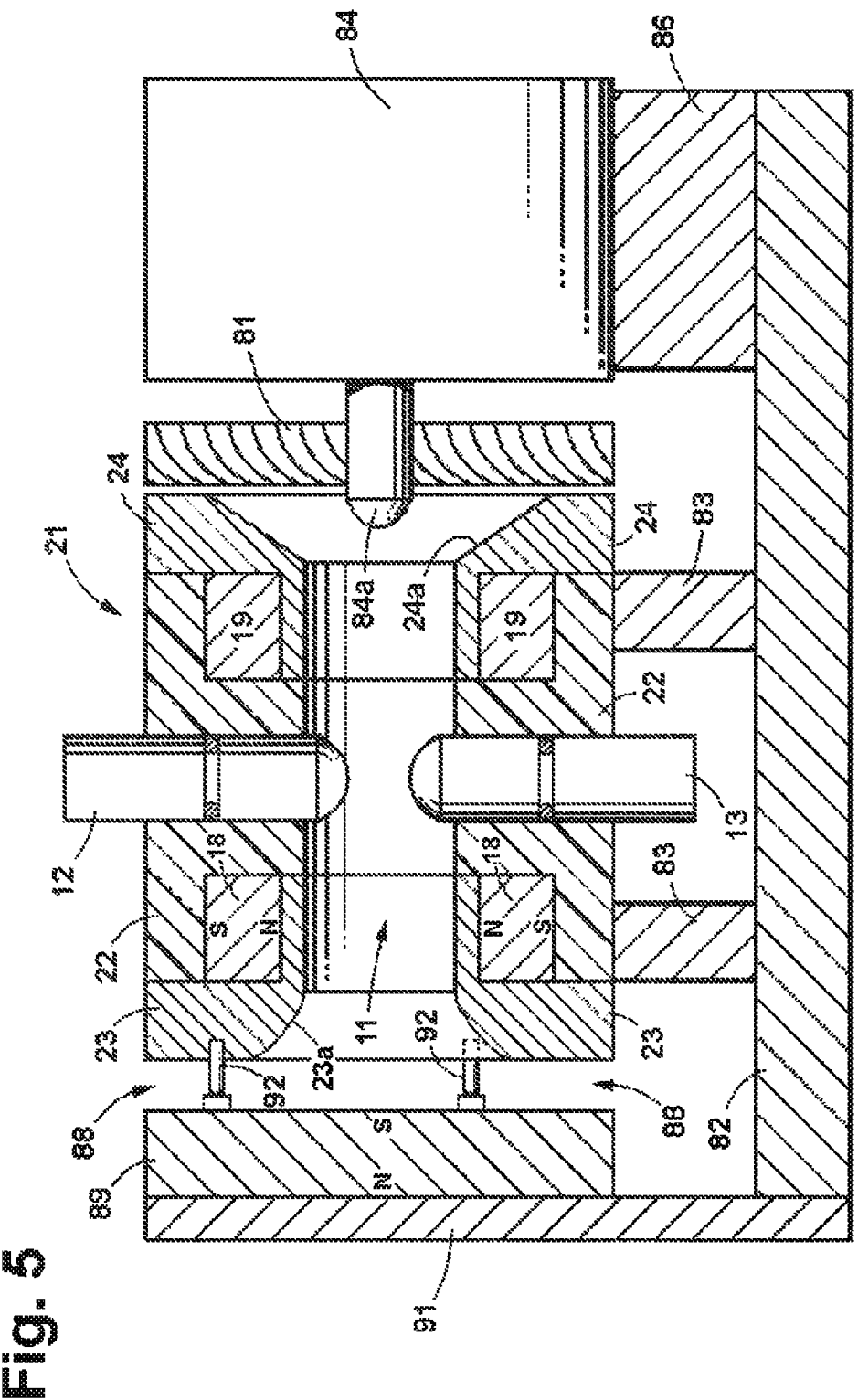

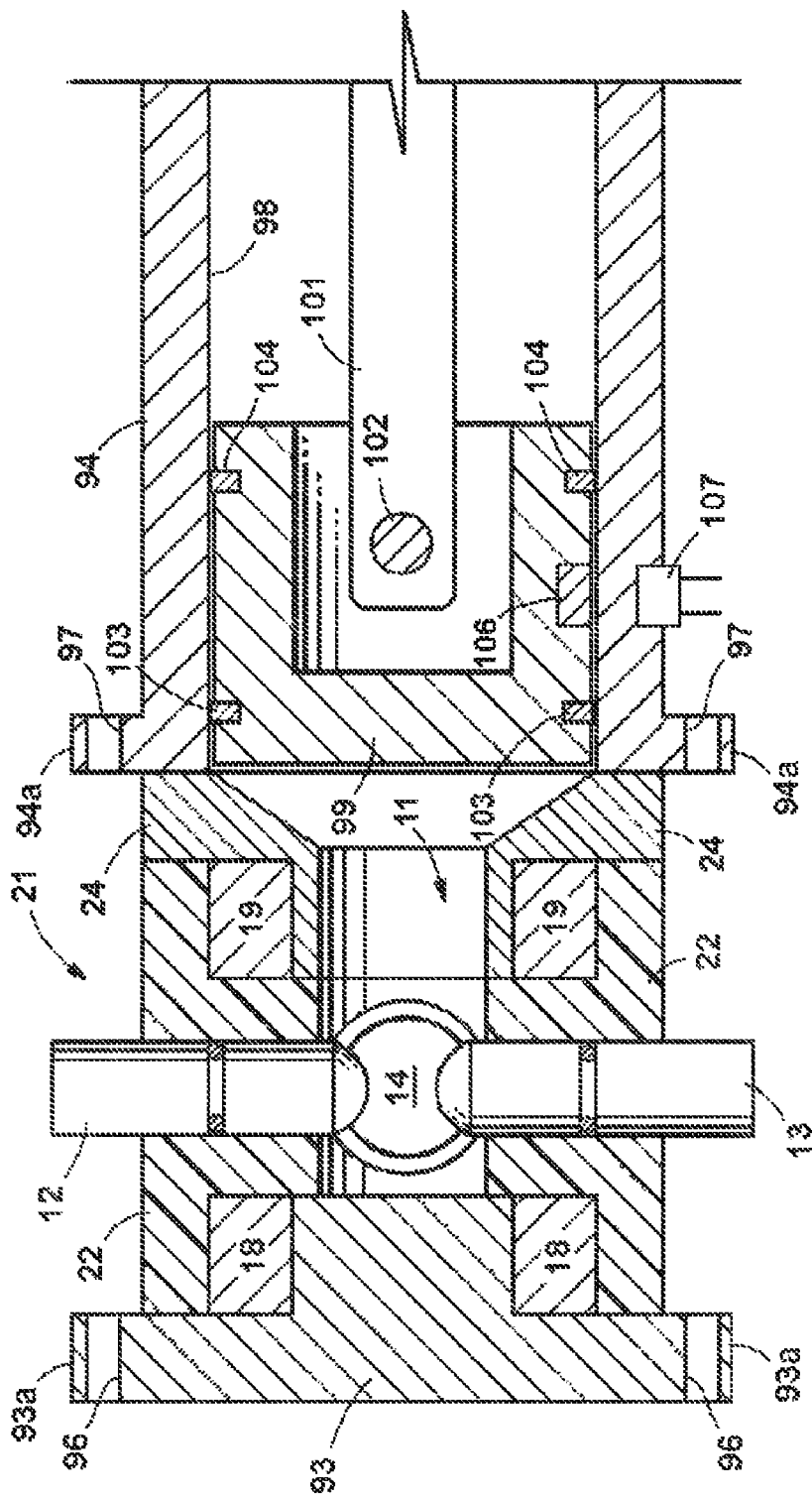

PULSED PLASMA ENGINE AND METHOD

RELATED APPLICATIONS

Division of Ser. No. 13/727,348, filed Dec. 26, 2012, U.S. Pat. No. 8,850,809, the priority of which is claimed.

BACKGROUND OF THE INVENTION

1. Field of Invention

This invention pertains generally to engines and, more particularly, to a pulsed plasma engine and method of operating the same.

2. Related Art

A pulsed plasma engine is a type of internal explosion engine that is generally similar in principle to an internal combustion engine except that it uses non-combustible gases such as air, oxygen, nitrogen or inert gas(es) instead of the combustible gases which are used in internal combustion engines.

U.S. Pat. No. 7,076,950 discloses an internal explosion engine and generator which has a cylinder, a piston which divides the cylinder into a pair of chambers that vary in volume in an opposite manner as the piston travels back and forth within the cylinder, a charge of non-combustible gas sealed within each of the chambers, means for alternately igniting the non-combustible gas in the two chambers in an explosive manner to drive the piston back and forth, and means coupled to the piston for providing electrical energy in response to movement of the piston.

Other examples of internal explosion engines are found in U.S. Pat. Nos. 3,670,494 and 4,428,193.

OBJECTS AND SUMMARY OF THE INVENTION

It is, in general, an object of the invention to provide a new and improved pulsed plasma engine and method of operating the same.

Another object of the invention is to provide a pulsed plasma engine and method of the above character which overcome limitations and disadvantages of engines heretofore provided.

These and other objects are achieved in accordance with the invention by providing a pulsed plasma engine and method in which a noncombustible gas is introduced into an explosion chamber, the gas is ionized to form a plasma within the chamber, an electrical pulse is applied to the plasma to heat the plasma, the pulse is turned off to produce an explosive pressure pulse in the plasma, and the plasma is confined in the chamber by a magnetic field that directs the pressure pulse toward an output member which is driven by the pressure pulse.

BRIEF DESCRIPTION OF THE DRAWINGS

FIG. 5 is a vertical sectional view of another embodiment of a turbine engine incorporating the invention.

FIG. 6 is a vertical sectional view of one embodiment of a reciprocating piston engine incorporating the invention.

DETAILED DESCRIPTION

Figure 1:
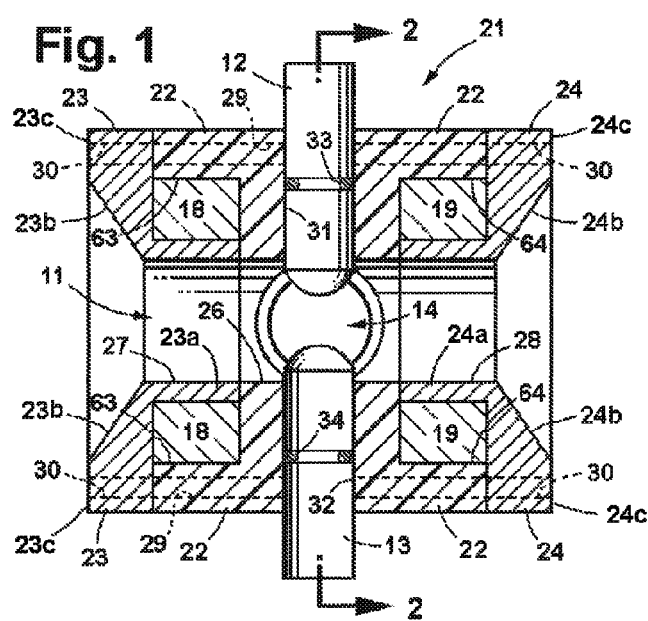
FIG. 1 is a vertical sectional view of one embodiment of a power core module for a pulsed plasma engine incorporating the invention.
Figure 2:
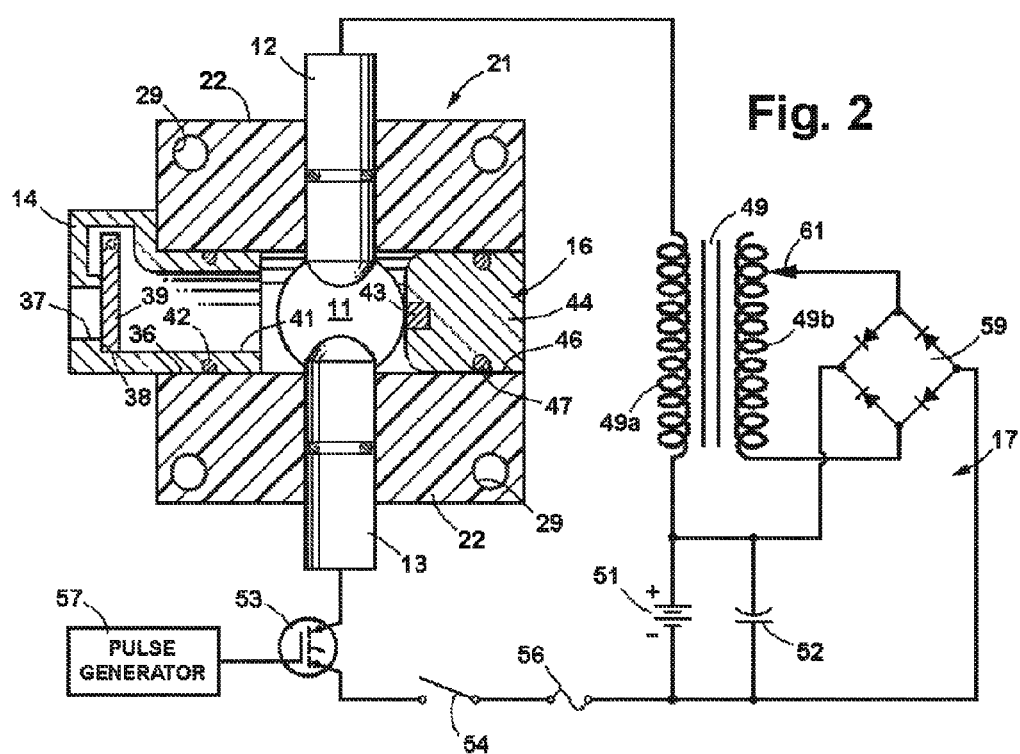
FIG. 2 is a cross-sectional view taken along line 2-2 of FIG. 1 in combination with a schematic diagram of an electrical circuit for pulsing the plasma in the embodiment of FIG. 1.

As illustrated in FIGS. 1 and 2, the power core has an explosion chamber 11, a pair of electrodes 12, 13, a valve 14 through which a noncombustible gas such as air is introduced into the chamber, means 16 for ionizing the gas to form a plasma within the chamber, a circuit 17 for applying electrical pulses to the electrodes to heat the plasma and produce explosive pressure pulses, and magnets 18, 19 for creating a magnetic field within the chamber to confine the plasma and direct the pressure pulses toward output members such as turbine wheels or reciprocating pistons (not shown) at the ends of the chamber.

The power core is constructed in the form of a generally cubical or rectangular module 21 having a central body section 22 with end pieces 23, 24 on opposite sides of the central section. Axially aligned bores 26-28 extend through the three sections to form the explosion chamber which opens through the end pieces. The bores are generally circular and of equal diameter, and the side wall of the chamber is generally cylindrical. Central body section 22 is fabricated of an insulative ceramic material such as a silicon oxide ceramic, and end pieces 23, 24 are fabricated of an electrically nonconductive ceramic material of low thermal conductivity. The three sections are held together by bolts (not shown) which pass through mounting holes 29, 30 in the central section and end pieces.

Electrodes 12, 13 are mounted in vertically aligned bores 31, 32 in central body section 22, with the tips of the electrodes extending into the explosion chamber and O-rings 33, 34 providing seals between the electrodes and the walls of the bores. The electrodes are fabricated of a high temperature, electrically conductive material such as tungsten or thoriated tungsten.

Valve 14 is a one-way check valve mounted in a horizontally extending cross bore 36 that intersects and communicates with the bore for the explosion chamber. The valve has an inlet opening 37 surrounded by a valve seat 38, with a pivotally mounted valve member 39 that is urged into sealing engagement with the valve seat by a spring or other suitable means (not shown). The valve also has an outlet port 41 that communicates directly with the explosion chamber, with an O-ring 42 providing a seal between the valve body and the wall of the bore. This valve permits air and other gases to enter the chamber through the inlet port and prevents them from escaping from the chamber.

In the embodiment illustrated, the means 16 for ionizing the gas to form a plasma comprises a radiation ionizer having a source 43 of radioactive material such as Americium, rubidium, or thorium in a cartridge 44 mounted in a second horizontally extending cross bore 46 in central body section 22. This cross bore is aligned with the first, and it also intersects the bore for the chamber. The cartridge is oriented with the radioactive material facing the chamber and an O-ring 47 providing a seal between the cartridge and the wall of the bore. Alternatively, if desired, the ionization can be done by other suitable means such as a high breakdown voltage or high frequency radiation.

Ignition circuit 17 includes a source of high energy pulses comprising a transformer 49 having a primary winding 49a connected electrically in series with a battery 51 and electrodes 12, 13. The winding serves as an ignition coil, and a capacitor 52 is connected across the battery to stiffen the current applied to the coil. One end of the primary winding or coil is connected directly to electrode 12, and the other end is connected to the positive terminal of the battery. The negative terminal is connected to the emitter of an insulated-gate bipolar transistor (IGBT) 53 through an ON/OFF switch 54 and a fuse 56. The collector of the IGBT is connected to the second electrode 13, and a pulse generator 57 is connected to the gate.

A bridge rectifier 59 is included in the circuit for recharging battery 51. In the embodiment illustrated, transformer 49 is an adjustable transformer, with one input of the rectifier being connected to one end of secondary winding 49b and the other being connected to a variable tap 61 on the secondary winding. One output of the rectifier is connected to the positive terminal of the battery, and the other is connected to the negative terminal.

Magnets 18, 19 are rare earth, radially polarized, permanent ring magnets which are disposed coaxially of the explosion chamber in counterbores 63, 64 toward opposite ends of the chamber. End pieces 23, 24 have axially extending cylindrical flanges 23a, 24a which extend into the counterbores and are encircled by the magnets. The end pieces provide heat shielding for the magnets and also serve as adapters for mounting the module to the rest of the engine, including mounting on the block of a conventional internal combustion engine in place of the cylinder heads. The end pieces can be configured as desired to match different engines. In the embodiment of FIGS. 1 and 2, they have conically tapered output ports 23b, 24b which communicate with the explosion chamber and open through the outer faces or mounting surfaces 23c, 24c of the end pieces, and the power core module is affixed to the rest of the engine by bolts (not shown) passing through mounting holes 29, 30.

Operation and use of the power core and therein the method of the invention are as follows. Air flows into explosion chamber 11 through check valve 14, and ON/OFF switch 54 is closed to turn on the ignition circuit, with charge from battery 51 building up on capacitor 52. The air in the chamber is ionized by radiation from source 43 to create an electrically conductive plasma between electrodes 12, 13. Pulses applied to the gate of IGBT 53 by pulse generator 57 cause the IGBT to turn on and complete the circuit between transformer winding 49, the battery, and the electrodes. This causes a sudden increase in current through the winding and produces high energy pulses which are applied to the electrodes. The electrical current flowing through the electrically conductive plasma between the electrodes heats the plasma to a very high temperature, and as long as each pulse remains on, the heated plasma remains in the gap between the electrodes. When the pulse turns off, the heat is released from the gap in an explosive manner, producing a high pressure shock pulse that can be utilized in driving an output member such as a turbine or a piston.

Figure 3:
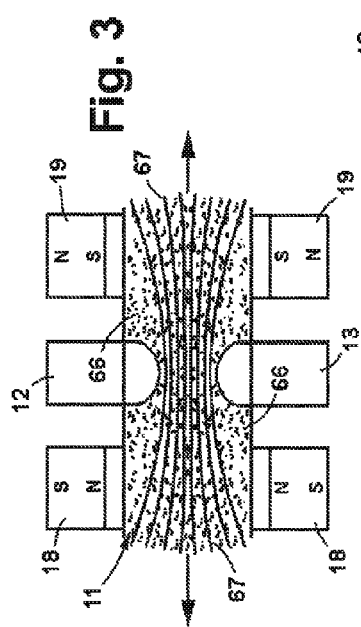
FIG. 3 is a schematic, fragmentary, vertical sectional view illustrating operation of the embodiment of FIG. 1.

As illustrated in FIG. 3, magnet 18 is polarized with its north pole on the inner side of the ring and the south pole on the outer side, and magnet 19 is polarized in the opposite direction with its north pole on the outer side and the south pole on the inner side of the ring. The magnetic field created by the magnets confines the plasma 66 within the chamber and directs the pressure shock pulses in an axial direction toward the ends of the chamber, as illustrated by flux lines 67.

The electrical pulses are rectangular pulses of short duration and fast rise time, and the conductivity of the plasma between the electrodes is very high, typically greater than that of solid conductors such as gold, silver, or copper. Consequently, when the pulses are applied to the electrodes, an arc forms immediately, and the temperature of the plasma rises very quickly. The temperature remains substantially constant throughout the arc, with a high arc temperature of short duration producing substantially the same pressure in the chamber as one of longer duration.

The electrical pulses preferably have a width or duration of less than a millisecond and occur at a rate on the order of 500 to 1,000 per second, and, depending on the level of the power or energy applied, the plasma can reach temperatures on the order of 1,000 to 100,000° C. in nanoseconds. The arc is likewise turned off in nanoseconds or microseconds when the pulses are turned off. With a 100 kilowatt power supply and a pulse width of one millisecond, for example, the energy applied to the electrodes is on the order of 100 joules per millisecond, or 0.1 joules per microsecond.

The heat of the plasma is contained in the arc while the arc is turned on. When the arc is turned off, the heat is explosively released from the arc gap, producing a shock pulse of very short duration, e.g., microseconds.

The current flowing through the primary winding of transformer 49 to produce the arc induces a corresponding current in secondary winding 49b which is rectified by rectifier 59 and applied to battery 51 to recharge the battery.

Figure 4:
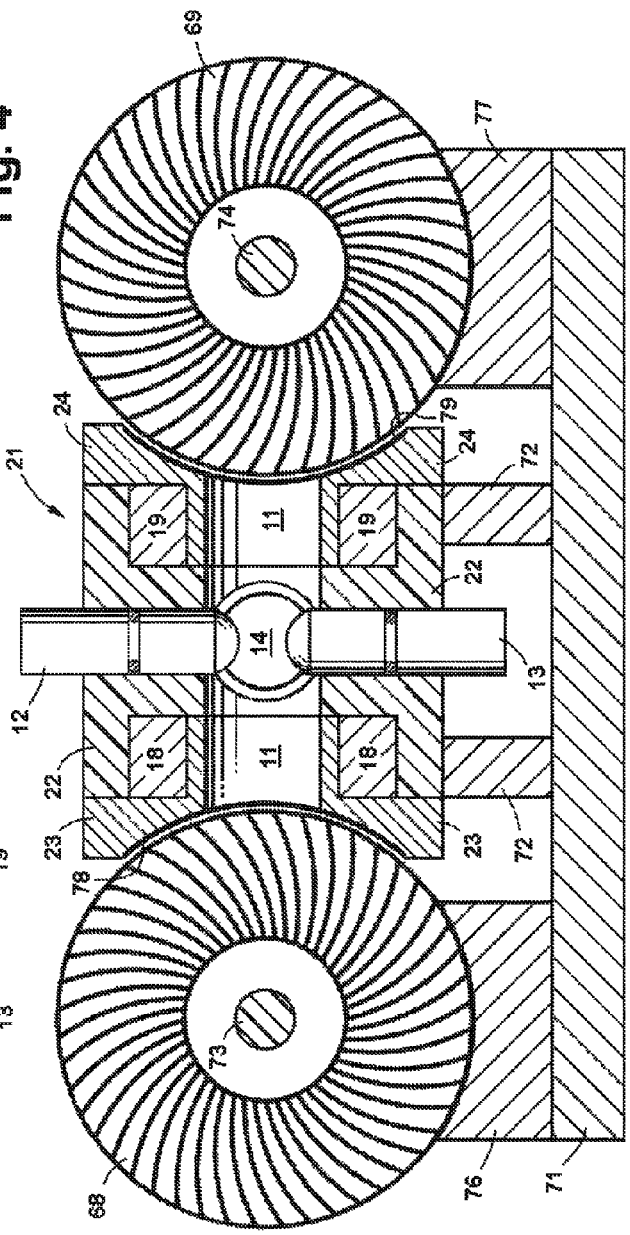
FIG. 4 is a vertical sectional view of one embodiment of a turbine engine incorporating the invention.

FIG. 4 illustrates an engine in which power core 21 drives a pair of turbine wheels 68, 69. This engine is shown as being constructed on a platform or base 71, with the power core mounted on a pair of support blocks 72 affixed to the base. Turbine wheels 68, 69 are affixed to output shafts 73, 74 which are rotatively mounted on support blocks 76, 77 affixed to the base at opposite ends of the power core. The turbine wheels are radially driven, and the output shafts are aligned with the axis of expansion chamber 11, but perpendicular to it, with edge portions of the wheels being received in cylindrical recesses 78, 79 in the outer faces of end pieces 23, 24.

In operation, the axially directed pressure pulses produced by the power core impinge radially upon the turbine blades, causing the turbine wheels and output shafts to rotate, with the pulses being delivered at a rate on the order of 500-1,000 pulses per second.

FIG. 5 illustrates an embodiment in which a single axial flow turbine wheel 81 is driven by the power core. This engine is also shown as being constructed on a platform or base 82, with the power core mounted on support blocks 83 affixed to the base. Turbine wheel 81 is affixed to the input shaft 84a of a generator 84 which is mounted on a support block 86 affixed to the base at one of the power core, with shaft 84a in axial alignment with the explosion chamber 11.

In this embodiment, power core 21 differs from the other embodiments in that air flows into the explosion chamber through an air gap 88 and the plasma is confined by a permanent magnet 89 at the end of the chamber opposite the turbine wheel. The magnet is mounted on a support bracket 91 affixed to base 82 and is spaced away from the outer face of end piece 23 to form the air gap. Spacers 92 extend between the end piece and magnet and help to support the magnet against the force of the pressure pulses directed toward it when the engine fires. The magnet is polarized from front to back and is oriented with its north pole facing out and its south pole facing in so it can cooperate with ring magnet 18 to form the magnetic field that confines the plasma to the chamber. The side wall of the inlet port 23a in end piece 23 is outwardly inclined and rounded to facilitate the flow of air between the air gap and chamber.

In operation, air flows freely into the chamber through the air gap, but once the air gets ionized in the chamber, the magnetic field produced by magnet 89 and ring magnet 18 confines the plasma and prevents it from escaping from the chamber through the air gap. As in the other embodiments, the magnetic field produced by ring magnets 18, 19 also confines the plasma and directs the pressure pulses in an axial direction to drive turbine wheel 81 and generator 84.

In the embodiment of FIG. 6, the power core is utilized in a reciprocating piston engine in which one end of explosion chamber 11 is closed by a plug 93 and a cylinder block 94 is attached to end piece 24 at the other end of the chamber. The power core module and cylinder block are held together by bolts (not shown) that pass through aligned openings 96, 97 in mounting tabs or lugs 93a, 94a that extend laterally from end plug 93 and cylinder block 94.

A cylinder 98 within the block is aligned axially with explosion chamber 11 and in direct communication with the explosion chamber through outlet port 24a in end piece 24. A piston 99 is connected to a crankshaft (not shown) by a connecting rod 101 and wrist pin 102 for reciprocating motion between top and bottom dead center positions, with rings 103, 104 providing a pressure-tight seal between the piston and the side wall of the cylinder.

Means is provided for monitoring the position of the piston within the cylinder and controlling the electric pulses so that the engine fires only when the piston is at or near its top dead center position or on a downstroke. This means includes a small magnet 106 which is mounted in the side wall or skirt of the piston and a Hall effect sensor 107 which is mounted on the side wall of the cylinder block toward the top of the cylinder. The sensor is connected to ignition circuit 17 to control the application of pulses to the electrodes.

When the piston is on a downstroke, air is drawn into explosion chamber 11 through a one-way valve 14, as in the embodiments of FIGS. 1, 2, and 4. When the piston reaches its top dead center position and the air between the electrodes is fully ionized, the Hall effect sensor connects the ignition circuit to the electrodes to create the arc and produce the pressure pulses in the plasma. With one end of the explosion chamber closed by the plug, the pressure pulses produced by the exploding plasma are all directed toward the piston to drive it toward bottom dead center. Before the piston reaches bottom dead center, the Hall switch disconnects the ignition circuit from the electrodes and keeps it disconnected until the piston reaches its top dead center position again.

The invention has a number of important features and advantages. It provides a highly efficient engine and method utilizing non-combustible gases such as air, oxygen, nitrogen, or inert gases. The plasma produced by ionizing the gas is highly conductive and is heated to extremely high temperatures by the intense arcing between the electrodes that occurs when electrical pulses of short duration are applied. With pulses having a duration or width of less than a millisecond and a rate on the order of 500 to 1,000 per second, the plasma can reach temperatures as high as 1,000 to 100,000° C. in nanoseconds. As long as the arcing continues, the heat of the plasma is contained in the arc, and when the arc is turned off, the heat is explosively released, producing powerful shock pulses which are captured and utilized in driving one or more output members such as turbines or pistons.

The efficiency of the engine is enhanced significantly by use of magnetic confinement to control the plasma and direct the shock pulses toward the output member(s).

Being constructed in modular form, the power core can be utilized in a wide variety of engines, including conventional internal combustion engines where it can be mounted on the engine block in place of the cylinder heads and fuel system.

It is apparent from the foregoing that a new and improved pulsed plasma engine and method have been provided. While only certain presently preferred embodiments have been described in detail, as will be apparent to those familiar with the art, certain changes and modifications can be made without departing from the scope of the invention as defined by the following claims.

The invention claimed is:

1. A method of operating an engine to drive an output member, comprising the steps of: introducing a noncombustible gas into an explosion chamber which communicates with the output member, ionizing the gas to form a plasma within the chamber, applying an electrical pulse to the plasma to heat the plasma, turning off the pulse to produce an explosive pressure pulse in the plasma, and magnetically confining the plasma in the chamber and directing the pressure pulse toward the output member.

2. The method of claim 1 wherein the noncombustible gas is air.

3. The method of claim 1 wherein the electrical pulse has a width of one millisecond or less and is applied approximately 500-1,000 times per second.

4. The method of claim 1 wherein the electrical pulse is applied to the plasma from a power supply through an isolation transformer and a switch controlled by pulses from a pulse generator.

5. The method of claim 4 further comprising the step of charging a battery in the power supply with energy from the transformer.

6. A method of operating an engine having an axially extending explosion chamber with open ends and a generally cylindrical side wall, the steps of: introducing a noncombustible gas into the chamber, ionizing the gas to form a plasma within the chamber, applying an electrical pulse to electrodes within the chamber to heat the plasma, turning off the pulse to produce an explosive pressure pulse in the plasma, and creating an axially extending magnetic field within the chamber with magnets disposed coaxially of the chamber on opposite sides of the electrodes to confine the plasma and direct the pressure pulse toward the open ends of the chamber.

7. The method of claim 6 wherein the gas is introduced into the chamber through a one-way valve.

8. The method of claim 6 including the steps of introducing air into the chamber through an air gap, and magnetically confining the plasma to prevent it from leaking out of the chamber through the air gap.

9. The method of claim 6 wherein the noncombustible gas is introduced through an inlet port that opens through the side wall on one side of the chamber and ionized by energy from ionizer mounted in a compartment that opens through the side wall on another side of the chamber.

10. The method of claim 6 wherein a turbine wheel at one end of the chamber is driven by the pressure pulse.

11. The method of claim 6 wherein a piston at one end of the chamber is driven by the pressure pulse.

12. A method of operating an engine to drive turbine wheels at opposite ends of an axially extending explosion chamber with a generally cylindrical side wall, the steps of: introducing a noncombustible gas into the chamber, ionizing the gas to form a plasma within the chamber, applying an electrical pulse to electrodes within the chamber to heat the plasma, turning off the pulse to produce an explosive pressure pulse in the plasma, and creating an axially extending magnetic field within the chamber with magnets disposed coaxially of the chamber on opposite sides of the electrodes to confine the plasma and direct the pressure pulse toward the turbine wheels.

13. The method of claim 12 wherein the noncombustible gas is air.

14. The method of claim 12 wherein the turbine wheels rotate about axes perpendicular to the chamber axis.

15. The method of claim 12 wherein the electrical pulse has a width of one millisecond or less, and such pulses are applied to the electrodes at a rate of approximately 500-1,000 pulses per second.

16. The method of claim 12 wherein pressure pulses are delivered to the turbine wheels at a rate on the order of 500-1,000 pulses per second.

\* \* \* \* \*